Patented May 14, 1940

2,200,879

UNITED STATES PATENT OFFICE 2,200,879

DENATURED ALCOHOL CONTAINING AN ACETYLATED HARDWOOD OIL

Louis J. Figg, Jr., Kingsport, Tenn., assignor to Eastman Kodak Company, Rochester, N. Y., a corporation of New Jersey No Drawing. Application September 18, 1937, Serial No. 164,572

12 Claims. (Cl. 202—77)

This invention relates to the denaturing of ethyl alcohol to compositions for use as denaturants, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

I have discovered that the products resulting from acetylation of the caustic-soluble oils obtained in the destructive distillation of hardwoods are effective denaturants for alcohol.

The oils obtained in the destructive distillation of hardwood boil from 150° C. to 310° C. They are of very complex composition, approximately seventy different compounds, of many different chemical classes, having been identified in them. I prefer to use that fraction of the oils which boils between 180° C. and 240° C., although I may use the oil of the entire boiling range, or I may use other fractions. Approximately 50% of these oils form sodium salts with sodium hydroxide and are known as caustic-soluble oils, while the remainder of the oils do not react with sodium hydroxide and are known as neutral oils. For aceytlation, I may use either the caustic-soluble oils or a mixture of both. The acetylation of the oils may be carried out as follows:

An excess of 95% acetic anhydride (1200 grams) and 25 grams of fused sodium acetate are placed in a reaction vessel equipped with an agitator and a reflux condenser. The mixture is refluxed until the approximate boiling point of acetic anhydride is reached. 400 grams of hardwood oil are then slowly added to the mixture, with constant agitation, refluxing being maintained. The vapor temperature gradually decreases until it has been reduced to 120–125° C. when all of the oil has been added. This is due to the conversion of the acetic anhydride to acetic acid. The mixture is refluxed for one hour after the addition of the hardwood oil has been completed. The mixture is then poured into water, and allowed to stand until all of the residual acetic anhydride has reacted with water. The acetylated oil is separated from the acetic acid solution and washed with water, then with a 1% sodium carbonate solution, and finally with a second water wash. A yield of 565 grams of acetylated hardwood oil is obtained. The product is light yellow in color, has a pleasant odor, and is insoluble in sodium hydroxide solution and in water. The acetylated oil is then vacuum distilled, a very pale, lemon-yellow material with a pleasant odor being produced.

It will be understood that other methods of acetylation may be employed.

If only the caustic-soluble hardwood oil is used in the acetylation, the resulting products are useful as perfume bases, as well as for denaturing.

In denaturing ethyl alcohol with my novel acetylated hardwood oils, I may use from 1 to 5 parts of acetylated wood oil, or even more, per 100 parts of 95% ethyl alcohol. This imparts a disagreeable taste, but does not cause the alcohol to have an objectionable odor. The acetylated wood oil may be used alone in denaturing, or it may be used in conjunction with other denaturing materials derived from the destructive distillation of hardwood, such as those which are described in my U. S. Patents 1,975,090; 1,975,091 and 1,197,092, or with any other denaturants with which it may be found to be compatible.

While I have described the acetylation of hardwood oil, and the use of acetylated hardwood oil as a denaturant, I may propionylate or butyrylate hardwood oil in the same manner, using the corresponding acid anhydride. The acylated hardwood oils thus produced may likewise be used for denaturing ethyl alcohol, in the same proportions as acetylated hardwood oil.

What I claim as my invention and desire to be secured by Letters Patent of the United States is:

1. An odorant especially adapted to be used as a denaturant, comprising the composition resulting from the acetylation of a caustic-soluble oil obtained by the destructive distillation of hardwood.

2. An odorant especially adapted to be used as a denaturant, comprising the composition resulting from the acetylation of a caustic-soluble portion of a fraction of the oil obtained by the destructive distillation of hardwood whose boiling range is between approximately 180° C. and approximately 240° C.

3. Denatured ethyl alcohol containing a composition resulting from the acetylation of a caustic-soluble oil obtained by the destructive distillation of hardwood.

4. Denatured ethyl alcohol containing a composition resulting from the acetylation of the caustic-soluble portion of a fraction of the oil obtained by the destructive distillation of hardwood whose boiling range is between approximately 180° C. and approximately 240° C.

5. Denatured ethyl alcohol containing, per 100 parts of 95% ethyl alcohol, from 1 to 5 parts, approximately, of a composition resulting from the acetylation of the caustic-soluble portion of an oil obtained by the destructive distillation of hardwood.

6. Denatured ethyl alcohol containing, per 100 parts of 95% ethyl alcohol, from 1 to 5 parts, approximately, of a composition resulting from the acetylation of the caustic-soluble portion of a fraction of the oil obtained by the destructive distillation of hardwood whose boiling range is between approximately 180° C. and approximately 240° C.

7. An odorant especially adapted to be used as a denaturant, comprising the composition resulting from the introduction of a fatty acyl radical containing from 2 to 4 carbon atoms into a caustic-soluble oil obtained by the destructive distillation of hardwood.

8. An odorant especially adapted to be used as a denaturant, comprising the composition resulting from the introduction of a fatty acyl radical containing from 2 to 4 carbon atoms into the caustic soluble portion of a fraction of the oil obtained by the destructive distillation of hardwood whose boiling range is between approximately 180° C. and approximately 240° C.

9. Denatured ethyl alcohol containing a composition resulting from the introduction of a fatty acyl radical containing from 2 to 4 carbon atoms into a caustic-soluble oil obtained by the destructive distillation of hardwood.

10. Denatured ethyl alcohol containing a composition resulting from the introduction of a fatty acyl radical containing from 2 to 4 carbon atoms into the caustic-soluble portion of a fraction of the oil obtained by the destructive distillation of hardwood whose boiling range is between approximately 180° C. and approximately 240° C.

11. Denatured ethyl alcohol containing, per 100 parts of 95% ethyl alcohol, from 1 to 5 parts, approximately, of a composition resulting from the introduction of a fatty acyl radical containing from 2 to 4 carbon atoms into the caustic-soluble portion of an oil obtained by the destructive distillation of hardwood.

12. Denatured ethyl alcohol containing, per 100 parts of 95% ethyl alcohol, from 1 to 5 parts, approximately, of a composition resulting from the introduction of a fatty acyl radical containing from 2 to 4 carbon atoms into the caustic-soluble portion of a fraction of the oil obtained by the destructive distillation of hardwood whose boiling range is between approximately 180° C. and approximately 240° C.

LOUIS J. FIGG, JR.